UNITED STATES PATENT OFFICE.

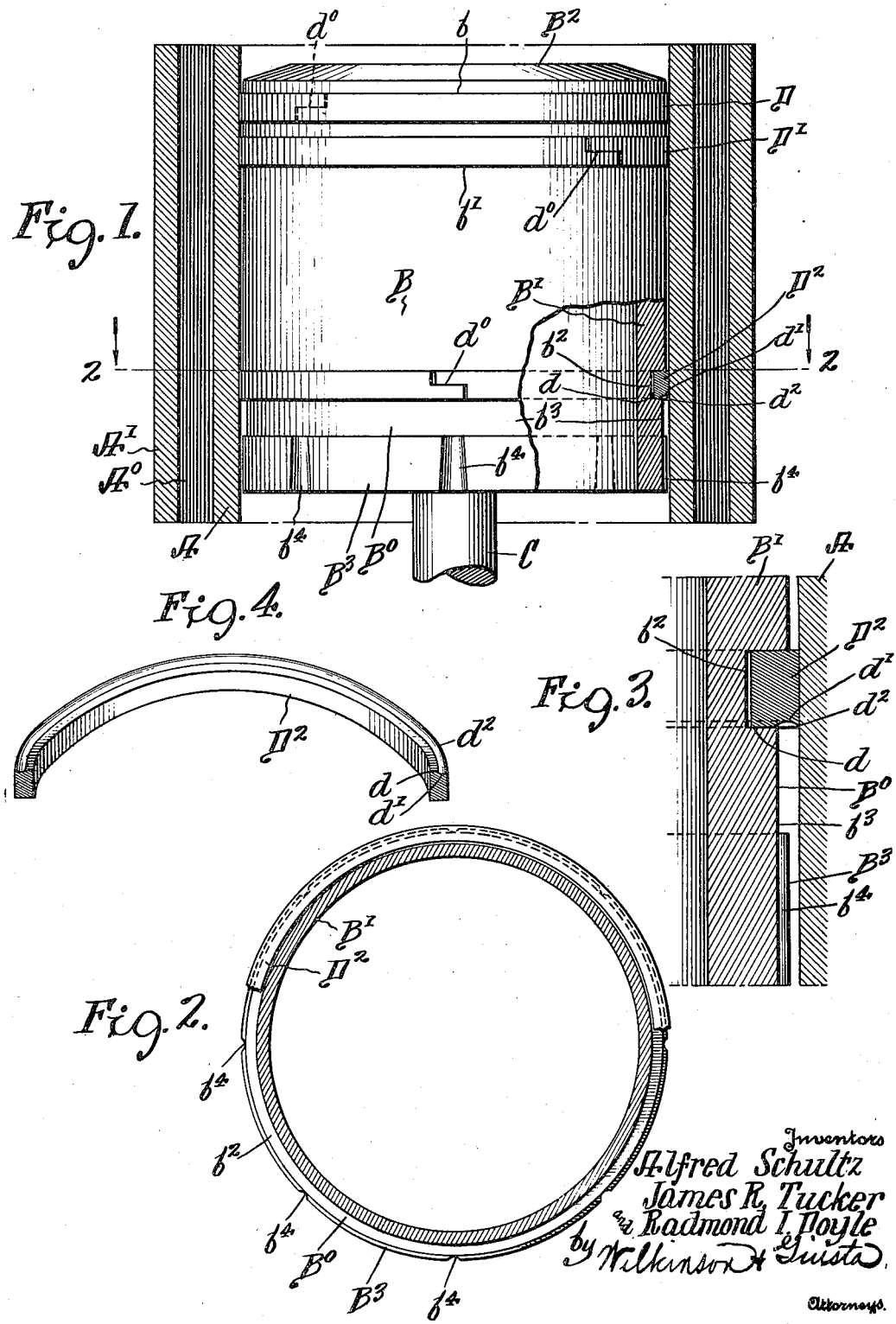

ALFRED SCHULTZ, JAMES ROBERT TUCKER, AND REDMOND I. DOYLE, OF BALTIMORE, MARYLAND.

METALLIC PACKING FOR PISTONS.

1,413,791. Specification of Letters Patent. Patented Apr. 25, 1922.

Application filed January 8, 1921. Serial No. 435,862.

*To all whom it may concern:*

Be it known that we, ALFRED SCHULTZ, JAMES R. TUCKER, and REDMOND I. DOYLE, citizens of the United States, residing at Baltimore, in the county of Baltimore City and State of Maryland, have invented certain new and useful Improvements in Metallic Packing for Pistons; and we do hereby declare the following to be a full, clear, and exact description of the invention, such as will enable others skilled in the art to which it appertains to make and use the same.

Our invention relates to improvements in metallic packing for pistons, and is especially intended to provide a suitable packing for use with internal combustion engines, such as motors for automobiles, trucks, or the like; but the invention is also applicable to other types of engines.

In such engines there is a tendency of the lubricating oil used in lubricating the cylinder to be carried from the open end of the cylinder past the piston and into the closed end, where said oil is consumed leaving a mass of charred carbon, which is thoroughly objectionable for various reasons well known in the art. It is, of course, essential to keep the piston lubricated, and at the same time it is also desirable to prevent the passage of the oil from the open to the closed end of the cylinder.

Our invention comprises a particular arrangement whereby the piston is made substantially gas-tight, and at the same time this passage of the oil from the open to the closed end of the cylinder is in a large measure prevented.

Our invention will be more fully understood after reference to the accompanying drawings, in which like parts are indicated by similar reference symbols throughout the several views, and in which:—

Figure 1 shows the piston in elevation, partly broken away, and the adjacent parts of the cylinder in section.

Figure 2 shows a section along the line 2—2 of Figure 1, and looking in the direction of the arrows, part of the ring being broken away to show the construction of the lower portion of the piston.

Figure 3 is an enlarged detail view of parts shown in Figure 1; and

Figure 4 shows a portion of the lower packing ring as used in our invention.

A represents the cylinder which may be of any suitable or desired construction, preferably provided with a jacket A' and with passages $A^0$ for the cooling medium.

B represents the piston which may be made of the usual standard type, and to which the piston rod C is connected in the usual way. This piston is preferably in the form of an inverted cup, having the side walls B' and the closed end $B^2$. The piston is provided with one or more annular grooves $b$, $b'$ and $b^2$ for the packing rings, three of which are shown. The piston is also reduced in diameter slightly, as at $b^3$, to form an annular channel $B^0$ in which the oil accumulates, as will be hereinafter described, and in rear of this channel $B^0$ the diameter of the piston is brought to the standard by means of a flange $B^3$, which has longitudinal grooves $b^4$ therein to permit the outflow of the oil from the channel $B^0$ down through the open end of the cylinder, as will be hereinafter more fully described.

The packings rings D and D' are preferably of the usual rectangular construction, with the L-shaped interlocking ends $d^0$, as shown, and the lower ring $D^2$ is preferably made of special cross section as shown most clearly in Figures 3 and 4, in which $d$ is an annular shoulder forming a bearing face for the lower edge of the ring against the corresponding wall of the ring grove $b^2$. Exterior to this annular shoulder $d$ is the annular groove $d'$ which is, in cross section, in the form of an arc of a circle, terminating in the sharp scraping edge $d^2$.

In operation, the rings D and D' exercise the normal function of maintaining a substantially gas-tight joint between the piston and the cylinder, which function is supplemented by the ring $D^2$, which latter ring has an added function in that the annular scraping edge $d^2$ tends to scrape the oil from the inner walls of the cylinder and direct it into the annular channel $B^0$. As the piston descends, this oil so scraped off accumulates in the channel $B^0$ and falls down through the passages $b^4$. The oil is supplied to the interior of the cylinder through the open end in the usual way.

It will be noted that as the ring $D^2$ wears on its outer face, the edge $d^2$ will always be ground sharp, so that no matter whether the ring wears or not this edge will be kept in the sharp condition and will scrape or plane off the oil from the inner wall of the cylinder, as hereinbefore described.

While we have shown three packing rings D, D' and D² the number of these packing rings may be increased or decreased as desired, or in exceptional cases a single packing ring D² may be used, the other rings D and D' being omitted.

It will be obvious that various other modifications might be made in the construction, combination and arrangement of parts which could be used without departing from the spirit of our invention; and we do not mean to limit the invention to such details except as particularly pointed out in the claim.

Having thus described our invention what we claim and desire to secure by Letters Patent of the United States is:—

In a metallic packing for pistons, the combination with a piston provided with an annular groove near the base thereof, said groove being rectangular in cross section, said piston being also provided with a relatively wide imperforate annular channel, in rear of said groove, and with a flange in rear of said channel, with longitudinal tapered axial passages provided in the said flange, of a split packing ring substantially rectangular in cross section provided on its rear face near the outer edge thereof with an annular groove arcuate in cross section, and terminating in an annular sharp scraping edge, the major portion of said arcuate groove projecting beyond the bottom of said channel while the ring is in use, substantially as and for the purposes described.

ALFRED SCHULTZ.
JAMES ROBERT TUCKER
REDMOND I. DOYLE.